March 2, 1965 — O. G. LENZ — 3,171,548
MULTI-LEAD HEADER HANDLING DEVICE
Filed April 30, 1962 — 2 Sheets-Sheet 1
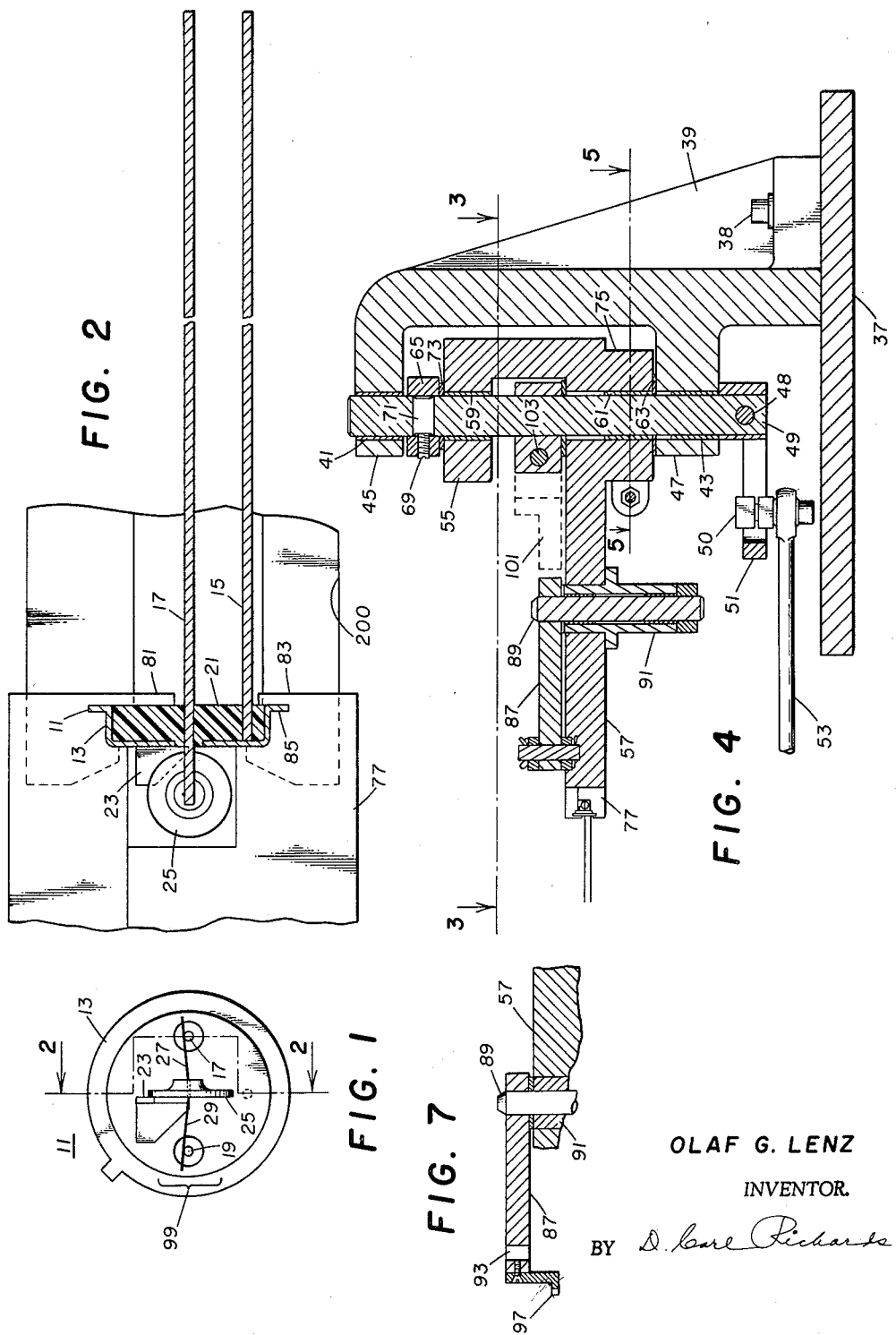
OLAF G. LENZ
INVENTOR.
BY D. Carl Richards March 2, 1965 O. G. LENZ 3,171,548
MULTI-LEAD HEADER HANDLING DEVICE
Filed April 30, 1962 2 Sheets-Sheet 2
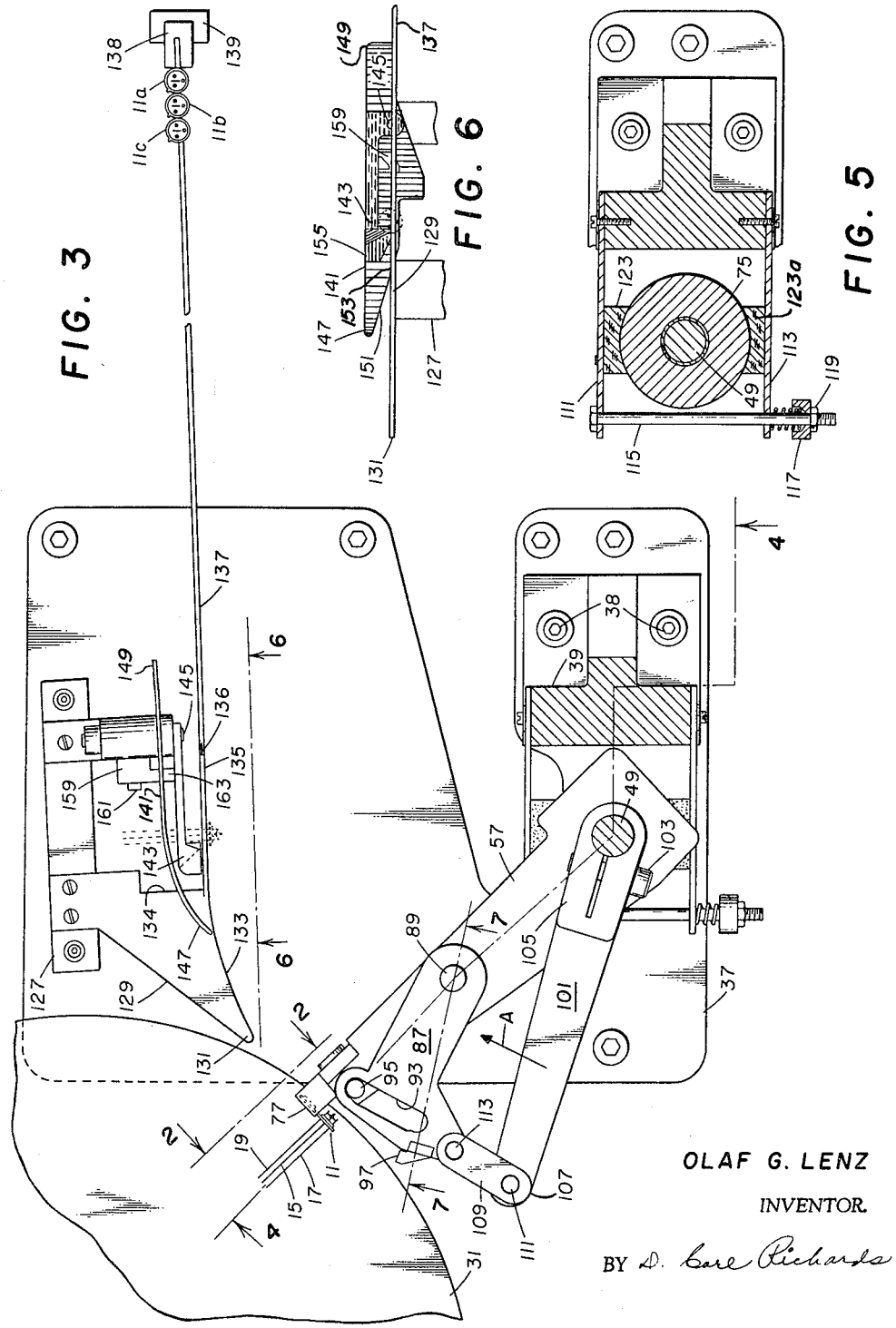
OLAF G. LENZ
INVENTOR.
BY D. Carl Richards

United States Patent Office 3,171,548
Patented Mar. 2, 1965

3,171,548
MULTI-LEAD HEADER HANDLING DEVICE
Olaf G. Lenz, Dallas, Tex., assignor to Texas Instruments Incorporated, Dallas, Tex., a corporation of Delaware
Filed Apr. 30, 1962, Ser. No. 191,032
14 Claims. (Cl. 214—1)

This invention relates to devices for handling multi-lead units and in a more specific aspect to unloading transistor header assemblies from a machine which performs some transfer or assembly function and depositing such assemblies on a holder in a predetermined relative orientation.

Transistor header assemblies may include a metallic disc which supports a plurality of lead wires. In one typical operation, a transistor wafer is to be welded at its base, collector and emitter terminals to suitable lead conductors in a header assembly. Operations involved in completing such connections to the transistor header assembly are automatic and are generally performed by a machine including a turntable. After several steps in fabrication, a header assembly is presented finally at an unloading station where it is to be removed from the machine and delivered for packaging or further assembly operations.

Prior art devices have employed magnetic forces to unload header assemblies. Notched wheel devices have similarly been employed. In such prior art devices, lack of positive control action has permitted the assemblies to jam the device with a consequent dumping of the headers and delay in production operations.

In accordance with the present invention there is provided a system for handling headers successively arriving at an unloading station with the headers having appended structure extending perpendicularly from one face thereof. A carrier has a slot open at both ends with the slot of transverse shape corresponding with a side silhouette of the header, and having a lateral opening for the appended structure. A shaft is mounted perpendicular to the length of the slot and is spaced from the station on the side of said header opposite the appended structure. An idler arm is mounted for free rotation on the shaft. A drive arm is keyed to the shaft for rotation therewith. Means are provided for driving the shaft with reciprocating rotary motion. A drag linkage is provided which terminates in a finger extending therefrom as to register with the slot. The drag linkage extends between the idler arm and the drive arm for permitting movement of the drive arm relative to the idler arm over an arc where, at one extremity, the finger is at the mouth of the slot and at the other extremity the finger is rotated substantially away from the mouth and toward the shaft. A brake normally restrains the idler arm for movement only under driving forces applied by the drive arm.

At a racking station each header has lead structure extending substantially horizontally including at least two leads which are to be turned from horizontal orientation and racked with the same orientation of the leads of one header relative to the leads of another header as at the unloading station.

A plate is supported in a substantially horizontal plane the extension of which lies intermediate the two leads and which has a leading edge adjacent to the unloading station and a trailing edge, with an arcuate edge extending from the leading edge to the trailing edge. A rod is attached to the trailing edge of the plate and extends therefrom tangent to the arcuate edge. A hook adjacent to said trailing edge is supported for pivotal movement in a plane parallel to the rod and extends upwardly from the plate toward its leading edge as to engage the header leads to restrain and remove the header from the carrier.

Means are then provided adjacent the trailing edge to engage the leads above the plate and to bias the same downwardly to rotate them relative to the rod thereby to complete the racking operation.

These and other objects are effected by the present invention as will be apparent from the following description taken in conjunction with the accompanying drawings in which:

FIGURE 1 is a top view of a transistor header assembly;

FIGURE 2 is an elevational view of a transistor header assembly and carrier as viewed from line 2—2 of FIGURE 3;

FIGURE 3 is a sectional view of the header taken along line 3—3 of FIGURE 4, showing an unloading device constructed in accordance with a preferred embodiment of the invention;

FIGURE 4 is a sectional elevation view of the device of FIGURE 3 taken along line 4—4;

FIGURE 5 is a sectional view of the device of FIGURE 4 taken along line 5—5;

FIGURE 6 is an elevational view of the removal station taken from line 6—6 of FIGURE 3; and FIGURE 7 is a view taken along line 7—7 of FIGURE 3.

Referring now to FIGURES 1 and 2, there is illustrated a lead-supporting transistor header assembly 11 in which a shallow cup or tray 13 supports a plurality of leads. A base lead 15, shown in FIGURE 2, is connected directly to the tray 13 while leads 17 and 19, extending generally parallel to lead 15, pierce the bottom of the tray 13. The tray 13 is filled substantially level full with an insulating substance 21 which provides both mechanical support and electrical insulation. The leads are thus held in a direction generally perpendicular to the plane of the bottom of the tray 13. A tongue 23 is formed from the bottom of the tray 13, being bent outwardly at an angle of 90°. The tongue 23, preferably, lies in a plane perpendicular to the plane of the bottom of the tray 13 and intermediate the emergent ends of the leads 17 and 19. A metallic wafer 25 is attached to the tongue 23 as by welding or soldering. A pair of whisker leads 27 and 29 interconnect the leads 17 and 19 and collector and emitter terminals respectively of a semiconductor body on the metallic wafer 25.

The device shown in FIGURES 1 and 2 represents a lead-supporting transistor header assembly 11 which is substantially completed. Such assemblies are sequentially presented in such form at an unloading station for a welding machine turntable.

Referring to FIGURE 3, the header assembly 11 is ordinarily positioned in a nest in a welding machine having the intermittently moving turntable 31, a segment of which is shown and which turntable moves generally in a circle the perimeter of which is indicated in FIGURE 3. The assembly 11 is illustrated in the position normally assumed when it is ready to be removed from the turntable 31. The header assembly 11 is so positioned on the turntable 31 that the leads 15, 17, 19 extend radially towards the center of the turntable 31. They are in a predetermined orientation with the base lead 15 lowermost and the collector and emitter leads 17, 19 in a horizontal plane above the base lead 15.

In accordance with the present invention each header assembly 11 is removed from the turntable 31 at the unloading station and deposited on a rack while maintaining an established predetermined relative orientation of the leads. Furthermore, at the unloading station, a device rotates the assembly into a vertical lead position while maintaining the same relative orientation of leads.

An extractor system is shown in FIGURES 3, 4 and

5. A base 37 is provided as a common support for the extractor 33. The extractor includes a standard 39 which is attached to the base 37 by suitable fasteners 38. Standard 39 includes yoke arms 45 and 47 spaced one above the other. A bearing 41 in arm 45 is vertically aligned with a bearing 43 in arm 47. A shaft 49 is journalled in the bearings 41 and 43 so as to be substantially perpendicular to the base 37. The lower end of the shaft 49 projects below the lower bearing 43 a distance sufficient to support a crank arm 51. The crank arm 51 is rigidly secured to the shaft 49 by pin 48 and extends perpendicularly therefrom. A push rod 53 is linked to the crank arm 51 to move the shaft 49 with an intermittent oscillatory motion. The coupling 50 provides for adjustment of the length of the effective crank arm, the coupling 50 being seated in a longitudinal slot in arm 51. The motion of the shaft 49 is synchronized with the intermittent rotary movement of the turntable 31.

Disposed intermediately the arms 45 and 47 is a main crank having a main arm 57 and a support arm 55. Bearings 59 and 61 are mounted in arms 55 and 57 respectively and are journalled to the shaft 49. Between the lower face of the main arm 57 and the upper face of the arm 47 there is provided a thrust bearing 63. A lock ring or collar 65 encircles the shaft 49 intermediately the lower face of the upper yoke arm 45 and the upper face of the upper crank arm 55. The collar 65 is provided with a threaded radial aperture wherein a screw 69 engages a recessed portion 71 of the shaft 49.

Another thrust bearing 73 is inserted between the opposing surfaces of the collar 65 and the upper yoke arm 55. The outer extremity of the crank arm 57 supports a carrier 77 shown in the enlarged view of FIGURE 2. Carrier 77 is provided with a slot having a shape conforming to the silhouette of the header assembly 11. A pair of shoulders 81, 83 are provided to engage the rim 85 of the tray 13 and to maintain its orientation in the carrier 77. There is a sufficient space between the shoulders 81, 83 to accommodate the extended leads 15, 17, 19 and the wafer structure therebetween.

A crank arm 87, FIGURES 3 and 4, having a pin 89 at one end mounted in a bearing sleeve 91 is supported on pin 89 by the crank arm 57 at a point intermediately its ends. There is provided in the free end of the crank arm 87 an elongated slot 93 extending transversely of the axis of the crank arm 87. A pin 95 which is attached to the crank arm 57 adjacent the carrier 77 is free to move within the slot 93 between its extremities. Extending outwardly from the free end of the crank arm 87, is an extractor finger 97. The finger 97 is shaped and is so positioned that, when the crank arm 87 pivots about the axis of pin 89, the finger 97 will engage the side of the tray 13 in the region 99, FIGURE 1.

Another crank arm 101 (best seen in FIGURE 3) is secured to the shaft 49 by a bolt or fastener 103 engaging the sides of the slotted end 105, which encircles the shaft. The free end 107 of the crank arm 101 extends from the shaft 49 substantially perpendicularly. The free end 107 and the slotted end of the crank 87 are connected by a link 109 which is pivoted to each respectively at pins 111 and 113. Both the crank arms 57 and 87 are free to rotate relative to shaft 49 and the pin 89 respectively under the driving influence of the crank arm 101 and the link 109.

FIGURE 5 illustrates, in section, a frictional braking device which includes a pair of elongated bars 111 and 113 extending in spaced parallel relation outwardly from the frame 39, preferably, in the direction of the crank arm 57. The bars 111, 113 straddle the lower hub 75 of arm 57. Bars 111 and 113 are linked together by a rod 115. The rod 115 extends through an aperture in the rod 113. A socket 117 and a nut 119 are provided on the end of the rod 115. A spring 121, encircling the extended rod 115 engages the bar 113 and the socket 117 to urge the ends of the bars 111, 113 toward each other.

A brake shoe 123 is provided between the bar 111 and the hub 75. The brake shoe is attached to the bar 111. A similar shoe 123a is mounted on arm 113. The brake shoes 123 and 123a are adapted to engage frictionally the surface of the hub 75. The brake shoe, of course, may be of any suitable material, but, in one embodiment, cork was employed.

Referring now to FIGURES 3 and 6, there is illustrated a plan and elevational view, respectively, of a header assembly stacking mechanism. There is provided a frame 127 on which is mounted a lead orienting spear plate 129. The plate 129 extends outwardly from the frame 127 in a generally horizontal plane, an extension of which plane lies between upper leads 17 and 19 and lower lead 15, FIGURES 1 and 2. The plate 129 has a pointed lead end 131 which is adjacent to and is directed toward the turntable 31. The plate 129 is provided with an arcuate edge 133 extending from the tip 131 in a direction generally parallel to the trajectory of the end of the crank arm 57. The arcuate edge 133 terminates at the rear edge 134 of the plate 129, and has a segment 135 extending in rod like form, but integral with plate 129 to a socket 136 which receives one end of a wire rack 137. The wire rack 137 projects outwardly and downwardly and is secured by a support 139.

A lead swinger arm 141 and a lead hook 143 are mounted on a pin 145 on the frame 127 so as to pivot in vertical planes spaced one from the other. The lead swinger arm 141 and the hook 143 rotate in vertical planes disposed between the rod 135 and the frame 127 and are substantially perpendicular to the plane of the plate 129. The lead swinger arm 141 has a pointed free end 147 which is shaped in an arc directed toward the arcuate edge 133. The other end 149 of the lead swinger arm 141 extends beyond the pin 145 to serve as a counterweight. The lower edge 151 of the arcuate end 147 slopes downward from a point adjacent the top edge toward the bottom edge. The sloping edge 151 engages the rear edge 134 of the plate 129 at a point 153. The lead swinger arm 141 pivots about the pin 145 to urge the sloping edge 151 into positive contact with the rear edge 134.

The hook 143 is pivoted on pin 145 and is provided with the other end free and having a head 155. The head 155 has a planar top surface substantially parallel to the plane of the plate 129. The other sides slope downwardly to form a generally inverted pyramidal shaped head.

An adjustable bar 159 is secured at one end to the support frame 127 by a fastener 161 and the free end extends generally perpendicular to the plane of the swinger arm 141 and the hook 143. The free end 163 projects beyond the swinger arm 141 to provide a convenient stop support for the hook 143. When desired, the relative position of the hook 143 may be adjusted by rotating the bar 159 about the fastener 161.

To understand the manner in which the system above described cooperates to extract header assemblies and deposit them on the wire rack, it should be understood that header assemblies such as header assembly 11 are presented in a nest at the position in which the header assembly 11 is shown in FIGURE 3. The nest carried by the turntable 31 is not shown in FIGURE 3 but is indicated by dotted outline 200 in FIGURE 2. The nest is in the form of a slot having an outline which corresponds with the side silhouette of the header plate 11. The leads 15, 17, 19 extend toward the axis of the turntable 31 through a passageway leading from the nest. The turntable 31 moves intermittently so that each header assembly 11, in its nest, comes to a rest position in the orientation shown in FIGURE 3. The turntable nest 200 remains in this position until after the header assembly is removed therefrom.

The push rod 53 of FIGURE 4 is actuated in synchronism with the turntable 31 to rotate shaft 49 through crank arm 51 thereby to swing the main crank arm 57 into such position that the slot in the carrier 77 is in exact alignment with the nest in the turntable structure 200.

In this position the edge of the carrier 77 abuts the edge of the structure 200 and there is a continuous slot extending through the structure 200 and the carrier 77. The carrier is brought to this position by the force exerted by the crank arm 101 through linkage 109 and crank arm 87 at the end of their traverse in the counter-clockwise direction as viewed in FIGURE 3.

It will be remembered that the main crank arm 57, while mounted as an idler arm on shaft 49, is maintained stationary by the frictional brake shoe 123. Since the crank arm 101 is pinned to the shaft 49, the crank arm 57 is forced to rotate with the shaft 49. When the shaft 49 and the crank arm 101 rotate in the clockwise direction as indicated by arrow A, the main arm 57 initially remains stationary under the control of the brake 123. The secondary crank arm 87 is moved by crank arm 101 so that the finger 97 approaches the header assembly 11. Near the end of its stroke relative to crank arm 57 the crank arm 58 guides the finger 97 into engagement with the trailing edge of the header assembly disk 13. The force applied by the finger 97 wipes the header assembly out of the slot in the turntable nest structure 200 and into the aligned slot in the carrier 77. As the finger 97 causes the header assembly 11 to be completely inserted into the carrier 77, the pin 95 is engaged by the end of the slot 93 so that as the arm 101 continues in its travel in a clockwise direction, the main crank arm 57 is carried therewith. By this means, there is no tendency for the header assembly 11 to be ejected from the carrier. Rather, the finger 97 remains in contact with the header assembly throughout the traverse of the arm 57 as it is moved under the force applied by the crank arm 101. As the pin 97 engages the end of the slot 93 a force is applied to the main crank arm 57 to overcome the holding force of the brake 123. At this point the three arms 57, 87, and 101 move as a unit without relative motion therebetween toward the racking station. Thus the crank arms 101 and 87 operate to extract the header assembly 11 from its nest in the turntable structure 200 and deposit the same in the carrier and then apply a moving force to the carrier whereby the header assembly is maintained under positive control at all times. As movement of the crank arm 57 continues, the leads 17 and 19 pass above the spear plate 129 while the lead 15 passes beneath the plate 129. In passing over the plate 129, the lead 19 engages the sloping edge 151 of the swinger arm 141 raising the swinger 141 as it pivots about the pin 145. Further rotational movements of the arm 57 in the same direction threads the leads over the rod 137 and causes the lead 19 to engage the sloping surfaces of the hook 143 to raise the same. The hook pivots about the pin 145, in the same direction as the swinger arm 141. As the lead 17 passes the lowermost point of the hook 143, the hook 143 drops down, engaging the lead 17 to prevent any movement of the header assembly 11 in direction opposite arrow A. The weight of the hook is supported by the free end 163 of the bar 159 and is thereby prevented from causing damage to the leads. The crank arm 57 by this time has reached its maximum traverse. The motion of crank 51 is then reversed to rotate the shaft 49 and the crank arm 57 back to their starting positions. The hook 143 engages the lead 17 to wipe the header assembly 11 from the carrier 77. The weight of the free end 147 of the swinger arm resting on the leads 17 and 19 urges the leads downward until the leads assume a vertical position straddling the wire rack 137. Meanwhile, the crank arm 57 and carrier 77 are moved to the starting position preparatory to a succeeding cycle of extraction and removal of a header assembly.

The wire rack 137 preferably is tilted slightly downward toward the support 139 to cause the header assemblies to move by gravity away from the removal station. In either case, the header assemblies such as assemblies 11a, 11b, 11c, will be threaded on to the rack 137, with the leads corresponding to leads 17 and 19 located on one side of the rack 137 and the leads corresponding with the lead 15 on the other side of the rack. With this in mind, the rack 137 together with the guide or end member 138 may be removed bodily from the support 139 and from the coupling 136 and transported to a machine designed for further processing the transistor assembly. For example, the rack mounted assemblies would be fed to a machine in which a seal or cap would be placed over the header assemblies to complete the transistor structure.

From the foregoing it will be seen that there is provided a system for handling headers of transistor structures which successively arrive at an unloading station on an assembly turntable. In each case the headers have appended thereto structure such as the leads 15, 17, 19 which extend away from the underface of the header. The system includes a carrier which has a slot open at both ends, which carrier has a transverse shape corresponding with the side silhouette of the header and has a lateral opening through which the lead structure may extend. The slot is in exact alignment with a nest slot in the turntable structure 200. A shaft 49 is spaced from the unloading station on the side of the header opposite the lead structure. An idler arm 57 is mounted on the shaft and supports the slotted carrier at one extremity thereof. A second or drive arm 101 is keyed to the shaft 49 for rotation with the shaft. Means are then provided for driving shaft 49 as through crank arm-pusher rod combination 51, 53 with reciprocating rotary motion which is synchronized with the movement of the turntable 31. A drag linkage including the crank arm 87 and the link 109 is provided with the crank arm 87 including a finger extending therefrom as to register in the slot in the carrier 77. The drag linkage is coupled to the idler arm 57 to drive it with the crank arm 101. The drag linkage includes the relatively short crank arm 87 which is mounted for rotation on shaft 89 such that the finger 97 in its trajectory during travel in a counter clockwise direction will be clear of a header assembly and the turntable nest structure 200 as will be presented during the time interval that a header assembly is being unloaded onto the rack 137. At the same time, the linkage permits positive engagement with the header assembly when motion of crank arm 101 is initiated in the direction of arrow A. Relative movement is permitted between crank arm 87 and idler arm 57 over an arc where at one extremity the finger 97 is at the mouth of the slot in carrier 77 and at the other extremity the finger is rotated away from the mouth of the carrier slot and, on the relatively short radius involved in crank arm 87, is rotated back toward the shaft 49.

The brake 123 normally restrains the idler arm 57 so that it will move only under the driving forces applied from the second arm. At the racking station the header discs are maintained with the leads extending substantially horizontally therefrom. The leads are to be threaded over a carrier on a rack and are to be turned from horizontal orientation to vertical orientation and when on the rack are to have the same relative orientation, one header assembly with respect to the other header assembly, as presented at the turntable unloading station. The guide plate 129 is supported in a substantially horizontal plane, the extension of which lies intermediate the two leads 15 and 19 of the header assembly 11 as it is presented at the turntable unloading station. The plate 129 has a trailing edge 134 which is joined to the tip of the plate 131 by an arcuate edge 133. The arcuate edge 133 is spaced from the center of shaft 49 a distance slightly greater than the distance from shaft 49 to the underside of header 11 as it is presented on the turntable 31. While the edge 133 can be other than arcuate, an arcuate form is preferable in order to maintain maximum stability to the header assembly as it travels to the racking station.

A rod 135 is provided which is little more than an extension of the edge portion 133 of the plate 129. In the form shown in FIGURE 3, the rod 135 is tangent to the arcuate edge 133. The carrier 77 supported by arm 57 moves under the force of the driving arm 101 to thread the leads 15 and 19 over the leading edge 131 of the plate 129. The carrier traverses an additional arc until the trailing lead 17, which is also located above the plate 129, is caught behind the hook 143. The hook 143 is adjacent to the trailing edge 134 of the plate 129 and is supported for pivotal movement in a plane parallel to the rod 135 and has faces extending upwardly from said plane toward the leading edge 131 of the plate 129. By this means the hook 143 engages the lead 17 and restrains the leads together with the header 13 from movement in a counterclockwise direction. At the same time the swinger bar 147 rests on the lead 19 so that as the arm 101 carries the idler arm 57 in a counterclockwise direction, the hook 143 will sweep the header assembly out of the carrier 77 following which the weight of the swinger arm 147 biases the leads downwardly to rotate them around the rod 135 until, under the force of gravity, they assume a vertical position. While the swinger bar 147 has been shown as a pivoted element it is to be understood that other forms of actuators may be employed. An air blast above the leads directing a blast of air downward thereon would serve satisfactorily. A biased roller system under which the leads 17 and 19 pass could also be employed.

Furthermore, it will be understood that while the system has been described as involving a turntable 31 and extractor systems 57, 87, and 101 all of which move in horizontal planes, the structure may be applicable to operation where the turntable is vertically oriented and the shaft 49 is horizontally oriented. In this case there would not be required the swinger arm 147. However, there would be maintained the positive control of the header assembly as it is moved from a turntable nest into the carrier slot. There would also be retained the latching features of the hook 143 to sweep the header assembly from the carrier slot at the end of its unloading traverse.

In all cases the positive control of the header assembly is maintained by reason of engagement between an element such as the finger 97 and the header assembly 11, the threading of the leads of the header assembly over the guide plate 129 and the latching of the header leads by the hook.

While the invention has been described in connection with a machine in which a transistor wafer element is welded to a header assembly, it is to be understood that the handling system herein described may be directly applicable to other operations where for example there may be no assembly function performed but merely a transfer of a header assembly or similar structure from one location to another where orientation is to be maintained.

Having described the invention in connection with the foregoing modifications, it is to be understood that further modifications may now suggest themselves to those skilled in the art and it is intended to cover such modifications as fall within the scope of the appended claims.

What is claimed is:

1. A system for racking headers successively presented at an unloading station with each header having at least a pair of appended structures extending away from one face thereof which comprises:
   (a) a carrier having a slot open at both ends, which slot has a transverse shape corresponding with a side silhouette of said header and a lateral opening for its appended structure,
   (b) carrier propelling means for moving said carrier between said unloading station and a racking station with reciprocating motion synchronized with delivery of successive headers to said unloading station,
   (c) a drag linkage including a header-engaging finger extending therefrom registrable with said slot and movable along a predetermined path relative to said carrier where, at one extremity of said path, said finger is at the mouth of said slot and at the other extremity said finger is moved substantially away from said mouth and out of the trajectory of said slot,
   (d) an orientation control plate supported in a plane, the extension of which lies intermediate said pair of structures and which plate has a leading edge adjacent to said unloading station and a trailing edge remote therefrom,
   (e) a racking rod attached to said trailing edge and extending from said plate at the side thereof adjacent to said trajectory, and
   (f) means adjacent said trailing edge and adapted to engage one of said structures as said carrier reaches said racking station to restrain headers at said racking station.

2. A system for racking headers successively presented at an unloading station with each header having at least a pair of appended structures extending horizontally away from one face thereof which comprises:
   (a) a carrier having a slot open at both ends, which slot has a transverse shape corresponding with a side silhouette of said header and a lateral opening for its appended structure,
   (b) carrier propelling means for moving said carrier between said unloading station and a racking station with reciprocating motion synchronized with delivery of successive headers to said unloading station,
   (c) a drag linkage including a header-engaging finger extending therefrom registrable with said slot and movable along a predetermined path relative to said carrier where, at one extremity of said path, said finger inserts said headers into said slot and at the other extremity said finger is rotated substantially away from and out of the trajectory of said slot,
   (d) an orientation control plate supported in a horizontal plane, the extension of which lies intermediate said pair of structures and which plate has a leading edge adjacent to said unloading station and a trailing edge remote therefrom,
   (e) a racking rod attached to said trailing edge and extending from said plate at the side thereof adjacent to said trajectory,
   (f) means adjacent said trailing edge and adapted to engage one of said structures as said carrier reaches said racking station to restrain headers at said racking station, and
   (g) means adjacent said trailing edge for applying a force perpendicular to said plane to bias said structures toward vertical orientation.

3. A system for racking headers successively presented at an unloading station with each header having at least a pair of appended structures extending away from one face thereof which comprises:
   (a) a carrier having a slot open at both ends, which slot has a transverse shape corresponding with a side silhouette of said header and a lateral opening for its appended structure,
   (b) a shaft spaced from said station on the side of said header opposite said structure,
   (c) an idler arm mounted on said shaft and supporting said carrier at the extremity thereof,
   (d) a drive arm secured to said shaft for rotation therewith,
   (e) a drag linkage including a header-engaging finger extending therefrom registrable with said slot and coupling said drive arm to said idler arm for permitting movement of said drive arm relative to said idler arm over an arc where, at one extremity, said finger inserts and holds said headers in said slot and at the other extremity said finger is rotated substantially away from said slot toward said shaft and out of the trajectory of said slot,
   (f) means for driving said shaft with reciprocating rotary motion in synchronism with delivery of successive headers to said station for moving said carrier from said unloading station to a racking station,
   (g) an orientation control plate supported in a plane, the extension of which lies intermediate said pair of structures and which plate has a leading edge adjacent to said unloading station and a trailing edge remote therefrom, (h) a racking rod attached to said trailing edge and extending from said plate at the side thereof adjacent to said trajectory, and (i) means adjacent said trailing edge and adapted to engage the one of said pair of structures above said plate as said carrier reaches said racking station to restrain headers at said racking station.

4. The combination set forth in claim 3 in which friction means normally engages said idler arm to prevent movement thereof except under application of a positive force from said drive arm.

5. A system for unloading headers successively presented at an unloading station with each header having appended structure extending away from one face thereof, which comprises:

(a) a carrier having a slot open at both ends, which slot has a transverse shape corresponding with a side silhouette of said header and a lateral opening for said structure, (b) carrier propelling means for moving said carrier along a predetermined trajectory leading from the position of said headers at said unloading station, (c) a drag linkage including a header-engaging finger extending registrable with said slot and coupling carrier propelling means to said carrier for permitting movement of said finger relative to said slot over a path where, at one extremity of said path, said finger inserts and holds said header in said slot and at the other extremity said finger is moved substantially away from said slot and out of the trajectory of said slot, and (d) means for driving said carrier propelling means with reciprocating rotary motion in synchronism with delivery of said headers to said station.

6. A system for unloading headers successively presented at a station with each header having appended structure extending away from one face thereof, which comprises:

(a) a carrier having a slot open at both ends, which slot has a transverse shape corresponding with a side silhouette of said header and a lateral opening for said structure, (b) a shaft spaced from said station on the side of said header opposite said structure, (c) an idler arm mounted on said shaft and supporting said carrier at the extremity thereof, (d) a drive arm secured to said shaft for rotation therewith, (e) a drag linkage including a header-engaging finger extending therefrom registrable with said slot and coupling said drive arm to said idler arm for permitting movement of said drive arm relative to said idler arm over an arch where, at one extremity, said finger inserts and holds said header in said slot and at the other extremity said finger is rotated substantially away from said slot toward said shaft and out of the trajectory of said slot, and (f) means for driving said shaft with reciprocating rotary motion in synchronism with delivery of said headers to said station.

7. A system for handling headers successively presented at an unloading station with each header having appended structure extending away from one face thereof, which comprises:

(a) a carrier having a slot open at both ends, which slot has a transverse shape corresponding with a side silhouette of said header and a lateral opening for said structure, (b) a shaft spaced from said station on the side of said header opposite said structure, (c) an idler arm mounted on said shaft and supporting said carrier at the extremity thereof, (d) a drive arm secured to said shaft for rotation therewith, (e) a drag linkage including a header-engaging finger extending therefrom registrable with said slot and coupling said drive arm to said idler arm for permitting movement of said drive arm relative to said idler arm over an arc where, at one extremity of said arc, said finger inserts and holds said header in said slot and at the other extremity of said arc said finger is rotated substantially away from said slot toward said shaft and out of the trajectory of said slot, (f) means for driving said shaft with reciprocating rotary motion of less than a complete revolution in synchronism with delivery of said headers to said station for movement of said carrier between said unloading station and an output station, and (g) means at said output station for sweeping said headers from said slot as said carrier returns to said unloading station.

8. A system for handling headers successively arriving at a station with each header having appended structure extending away from one face thereof which comprises:

(a) a carrier having a slot open at both ends, which slot has a transverse shape corresponding with a side silhouette of said header and a lateral opening for said structure, (b) a shaft spaced from said station on the side of said header opposite said structure, (c) an idler arm mounted for free rotation on said shaft and supporting said carrier at the extremity thereof, (d) a drive arm secured to said shaft for rotation therewith, (e) an intermediate arm pivotally mounted intermediate the length of said idler arm and terminating in a header-engaging finger extending therefrom as to register with said slot, (f) a drag linkage between said drive arm and the end of said idler arm including a slotted end of said intermediate arm for permitting movement of said drive arm relative to said idler arm over an arc where, at one extremity, said finger inserts and holds said headers in said slot and at the other extremity said finger is rotated relative to the pivot on said idler arm substantially away from said slot toward said shaft and out of the trajectory of said slot, and (g) means for driving said shaft in reciprocating rotary motion synchronized with delivery of each header to said station to pass each said header with said finger upon completion of a traverse in one direction in said arc and to sweep each said header into said slot under control of said finger at the completion of traverse in said arc in the other direction followed by movement of said carrier with said finger.

9. A system for racking lead-supporting header discs successively presented at an unloading station where said discs each have at least two leads extending generally away from one face of said discs and which when racked are to have the same orientation of said leads of one header relative to leads of the other headers as presented at said unloading station, which comprises:

(a) an orientation control plate supported in a plane the extension of which lies intermediate said two leads and which has a leading edge adjacent to said unloading station and a trailing edge remote therefrom, (b) reciprocating carrier means for moving forward each header disc relative to said plate with said face confronting and adjacent to one side of said plate with a first of said leads on one face of said plate and the second of said leads on the other face of said plate, (c) a racking rod attached to said trailing edge and extending from said plate at the side thereof adjacent to said carrier means, and, (d) structure adjacent to said trailing edge to engage at least one of said leads and restrain and remove said header discs from said carrier means upon reverse movement thereof.

10. A system for racking lead-supporting header discs successively presented at an unloading station where said discs each have at least two leads extending generally away from one face of said discs and which when racked are to have the same orientation of said leads of one header relative to leads of the other headers as presented at said unloading station, which comprises:
   (a) an orientation control plate supported in a substantially horizontal plane the extension of which lies intermediate said two leads and which has a leading edge adjacent to said unloading station and a trailing edge remote therefrom,
   (b) reciprocating carrier means for moving forward each header disc relative to said plate with said face confronting and adjacent to one side of said plate with a first of said leads above and the second of said leads below said plate,
   (c) a racking rod attached to said trailing edge and extending from said plate at the side thereof adjacent to said carrier means, and
   (d) structure adjacent to said trailing edge to engage at least one of said leads and restrain and remove said header discs from said carrier means upon reverse movement thereof.

11. A system for racking lead-supporting header discs successively presented at an unloading station where said discs each have at least two leads extending generally away from one face of said discs and which when racked are to have the same orientation of said leads of one header relative to leads of the other headers as presented at said unloading station, which comprises:
   (a) an orientation control plate supported in a substantially horizontal plane the extension of which lies intermediate said two leads and which has a leading edge adjacent to said unloading station and a trailing edge remote therefrom,
   (b) reciprocating carrier means for moving forward each header disc relative to said plate with said face confronting and adjacent to the side of said plate with a first of said leads above and the second of said leads below said plate,
   (c) a racking rod attached to said trailing edge and extending from said plate at the side thereof adjacent to said carrier means,
   (d) structure adjacent to said trailing edge to engage at least one of said leads and restrain and remove said header discs from said carrier means upon reverse movement thereof, and
   (e) means adjacent said trailing edge for applying a turning force to said discs to rotate said leads relative to said rod.

12. A system for racking lead-supporting header discs successively presented at an unloading station where said discs each have at least two leads extending generally away from one face of said discs and which when racked are to have the same orientation of said leads of one header relative to other headers as presented at said unloading station, which comprises:
   (a) an orientation control plate supported in a substantially horizontal plane the extension of which lies intermediate said two leads and which has a leading edge adjacent to said unloading station and a trailing edge remote therefrom,
   (b) reciprocating carrier means for moving forward each header disc relative to said plate with said face confronting and adjacent to the side of said plate with a first of said leads above and the second of said leads below said plate,
   (c) a racking rod attached to said trailing edge and extending from said plate at the side thereof adjacent to said carrier means,
   (d) a hook adjacent to said trailing edge to engage at least one of said leads and restrain and remove said header discs from said carrier means upon reverse movement thereof, and
   (e) a weight means movable relative to said trailing edge for engaging at least one of said leads to apply a turning force to said discs to rotate said leads relative to said rod.

13. The combination set forth in claim 12 in which said rod is bodily removable from said plate.

14. A system for extracting a lead supporting header assembly from a turntable and depositing said header assembly on a carrier with a predetermined orientation of its leads which comprises:
   (a) a crank arm slotted at one end thereof and mounted adjacent the opposite end thereof for rotation of the slot in a trajectory in a predetermined plane,
   (b) an actuating arm having a protrusion on one end and mounted at the other end for rotation about a point intermediate the ends of said crank arms with the trajectory of said protrusion limited at one extremity with said protrusion in registration with said slot and at the other extremity substantially removed from said slot and out of said trajectory,
   (c) intermittent drive means connected to said actuating arm,
   (d) an orientation control plate mounted adjacent the end of said crank arm in said plane between the trajectories of a pair of said leads and having one edge adjacent to said turntable and an opposite edge remote therefrom,
   (e) a latch mounted for orientation about an axis parallel to said plane for movement into and away from said plane at said opposite edge in response to engagement with said leads to restrain said headers at one end of the traverse of said crank, and
   (f) means at said opposite edge for engaging said leads at a point substantially spaced from the header of said assembly and biased to move said leads substantially perpendicular to said plane.

References Cited in the file of this patent
UNITED STATES PATENTS

| | | |
|---|---|---|
| 2,570,660 | Gamble | Oct. 9, 1951 |
| 2,978,117 | Thompson | Apr. 4, 1961 |
| 3,018,006 | Zilahy | Jan. 23, 1962 |